UNITED STATES PATENT OFFICE.

FREDERIC P. DEWEY, OF WASHINGTON, DISTRICT OF COLUMBIA.

PROCESS OF TREATING SULFIDS.

SPECIFICATION forming part of Letters Patent No. 561,544, dated June 2, 1896.

Original application filed November 28, 1892, Serial No. 453,372. Divided and this application filed December 17, 1894. Serial No. 532,079. (No specimens.)

*To all whom it may concern:*

Be it known that I, FREDERIC P. DEWEY, a citizen of the United States, residing at Washington, in the District of Columbia, have invented certain new and useful Improvements in Processes of Treating Sulfids; and I do hereby declare the following to be a full, clear, and exact description of the invention, such as will enable others skilled in the art to which it appertains to make and use the same.

In the lixiviation process of treating ores of the precious metals the ores are subjected to the action of solvents which extract the precious metals, and then the precious metals are recovered from these solutions. The most common way to recover the precious metals is to precipitate them as sulfids, in which case they will also be accompanied by the sulfids of other metals, particularly copper. The sulfids produced by the different lixiviation works vary very much in composition, according to the character of ore treated and the particular process of lixiviation employed. In general they consist in a mixture of sulfids of gold, silver, copper, and lead with free sulfur, and contain various impurities in small amounts. In many cases the amount of lead present is small, and it may be altogether absent. In general they may be said to vary as follows: Gold, trace to one per cent.; silver, five to seventy per cent.; copper, five to twenty per cent, and lead, nothing to fifteen per cent. The treatment of these sulfids, to separate and recover the precious metals, involves serious difficulties, and many processes have been proposed for the purpose. The chief difficulty in treating these sulfids lies in the presence of copper, which, as is well known, is a hard metal to separate from the precious metals. It has been proposed to treat the sulfids with a solution of sulfate of silver obtained in a later step of the process of refining; but this process requires that an amount of silver corresponding to the amount of copper in the sulfids shall be kept in rotation, being alternately dissolved in strong sulfuric acid and then precipitated as sulfid and roasted. This is expensive, and the chances for loss in the process and by theft are increased.

By the process described in this application, which is a division of my pending application, Serial No. 453,372, filed November 28, 1892, I produce the sulfate of silver directly from the sufids, as described in my pending case, Serial No. 445,207, filed September 6, 1892, and my Patent No. 490,068, issued January 17, 1893, as the first step in the operation, and thus avoid the use of extra silver and reduce the chances for loss.

In carrying out my process—for instance, upon Russell sulfids carrying a little gold, thirty per cent. silver, 20 per cent. copper, and small amounts of impurities—I first heat the mixed sulfids in an iron pot with twice their weight of strong sulfuric acid, whereby the silver and copper are converted into sulfates, and the sulfate of silver is dissolved by the excess of acid used. The solution of sulfate of silver in sulfuric acid is next diluted with water, and then more of the mixed sulfids are added, when there will be an interchange of metals, sulfate of copper will go into the solution, while sulfid of silver will be precipitated. The sulfid of silver of the mixed sulfids will not be acted upon by this treatment and will remain as an insoluble residue with the sulfid of silver precipitated by the reaction. The solution of sulfate of copper is now separated from the residue and precipitate and the copper removed by crystallization or otherwise.

The silver may be recovered from the separated sulfid in any convenient way. It may be dissolved in strong sulfuric acid, leaving any gold that may be present behind.

The solution of sulfate of silver can be separated from any residue left and the silver recovered by any well-known means.

I do not here claim the preliminary heating with strong sulfuric acid, as that is covered by my pending case, Serial No. 445,207, and my Patent No. 490,068, issued January 17, 1893; but What I do claim is—

1. The process of treating mixtures containing sulfids of silver and copper which consists in heating the mixture with strong sulfuric acid, adding water, adding more mixed sulfids, separating the solution of sulfate of copper from the residue containing the sulfid of silver, and heating the sulfid of silver with strong sulfuric acid to convert it into sulfate of silver, substantially as described.

2. The process of treating mixtures containing sulfids of silver and copper which consists in heating the mixture with strong sulfuric acid, adding water, adding more mixed sulfids, separating the solution of sulfate of copper from the residue containing the sulfid of silver, heating the sulfid of silver with strong sulfuric acid to convert it into sulfate of silver, separating the solution of sulfate of silver from any insoluble residue, and recovering the silver from the solution substantially as described.

In testimony whereof I affix my signature in presence of two witnesses.

FREDERIC P. DEWEY.

Witnesses:
    JNO. H. WALTER,
    LETA M. MORSE.